United States Patent Office 3,489,137
Patented Jan. 13, 1970

3,489,137
DEVICE FOR THE DETECTION OF THERMOGENOUS FOCUSSES
Henri Maurice Marchal and Marie-Thérèse Marchal, Paris, France, assignors to Centre National de la Recherche Scientifique, Paris, France, a French Government administration
Filed Oct. 12, 1964, Ser. No. 403,062
Claims priority, application France, Oct. 18, 1963, 951,109
Int. Cl. A61b 1/26, 6/12
U.S. Cl. 128—5
2 Claims

ABSTRACT OF THE DISCLOSURE

A device for detecting and locating thermogenous focusses such as tumors in accessible areas of the body, for instance in the lungs. Such a device is adapted for use with an endoscopic tube having windows and it comprises a rod on which are mounted two infra-red sensitive photo-cells spaced apart from each other. The outputs of said cells are fed to a differential receiver system which furnishes a current when one of the cells faces a tumor thereby having an electric output greater than that of the other cell.

---

The invention relates to devices for detecting and locating and/or studying the thermogenous focusses such as tumors, abscesses or cysts which will form abnormally in the human body and more specifically malignant tumors which form in the vicinity of natural channels which can be reached from outside (trachea-windpipe and bronchia, esophagus, colon), for instance with the help of a hollow tube such as those used for endoscopic examinations of said internal channels. For ease of description such tubes will be referred to hereafter as to "endoscopic tubes."

It is known that in the past years methods and devices have been developed for detecting and locating internal tumors without surgery. However, they are difficult to carry out and generally lack in precision. As a matter of fact, attempts have been made to take advantage of the known fact that the metabolism of cancerous tumors is markedly higher than the same of a normal human tissue, or even than that of benign tumors, whereby an increase of the emission of infra-red rays, in particular of rays whose wave lengths range from about 3 to about 10 microns, is noted. However, such rays are fully absorbed by a thin layer of human tissue (from about 2 to 3 mm.) so that such a thermogenous phenomenon for detecting and locating malignant tumors had been very seldom used heretofore.

It has been found that most of the cancerous tumors which appear in the lungs, for which this invention will have its most interesting application, are located in the immediate vicinity of the large channels which supply the lungs with air i.e. the trachea-windpipe and large bronchia.

Another difficulty encountered in the thermogenous detection of tumors in the lungs lies in the perturbations of the temperature in said large channels owing to the intake in the lungs of air from the outside which, in the general case, is at a cooler temperature than that of the body and the expulsion from the lungs of warmer air, such perturbations largely in most instances overwhelming or masking the small local increases of infra-red emission by the infected areas of such channels.

A general object of the invention is therefore to improve the existing methods and to provide devices for carrying out the improved methods with a greater accuracy than heretofore.

Another object of the invention is to provide devices for the detection of tumors which will isolate the above mentioned supplementary emission of infra-red radiations and compensate the natural infra-red emission of the internal tissues and other detrimental sources of perturbations of the temperature of internal natural channels.

To meet these objects, the device according to the invention for the detection of thermogenous focusses in the internal natural channels of the human body, and more specifically of the lungs, likely to be reached by conventional endoscopic tubes, comprises a rod, two means sensitive to infrared radiations mounted on said rod and sufficiently spaced apart one from another so as to substantially preclude the simultaneous irradiation of both sensitive means by the radiations emanating from a same thermogenous focus, said sensitive means producing electrical signal outputs varying in accordance with the intensity of the infra-red irradiation of said sensitive means to an external receiver system responsive to differences between the outputs of said sensitive means, said device being preferably likely to be inserted within and cooperate with endoscopic means provided with windows transparent to infra-red radiations and established in front of said sensitive means.

Other objects and advantages of the invention will become apparent as the following description proceeds, taken in conjunction with the following drawing in which.

While the invention is susceptible of various modifications and alternative forms, specific embodiments thereof have been shown by way of example and will be thereafter described in detail. It will be understood, however, that it is not intended to limit the invention to the particular form disclosed but, on the contrary, the invention is to cover all modifications, equivalents and alternatives falling within the spirit and scope of the invention as expressed in the appended claims.

Figure 1:
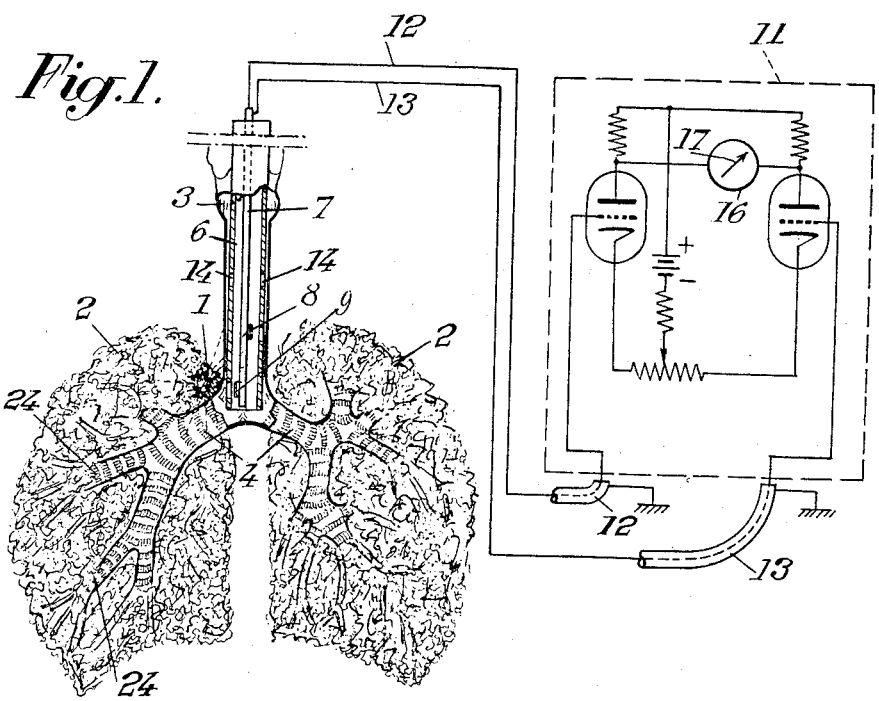
FIG. 1 shows diagrammatically and partly in section a detecting device established according to the present invention.

Referring more particularly to the drawings the device according to the invention is shown applied to the detection of a thermogenous focus 1, such as a cancerous tumor, in one of the natural channels of a lung 2. FIG. 1 illustrates the lung 2 with a trachea 3 and large bronchia 4 and a tumor 1 in the lower part of said trachea.

Provided within an endoscopic tube 6 the device according to one of the preferred embodiments of the invention comprises a rod 7, two photo-cells 8 and 9 sensitive to infrared radiations and capable of producing electrical signals, responsive to their infra-red irradiation, which are fed to an external receiver system 11 connected to said photocells through protected wires 12 and 13 (represented only externally to the tube 6).

To permit the infra-red radiations emitted by local areas of the trachea 3 or large bronchia 4 to fall on the photo-cells 8 and 9, windows transparent to infra-red radiations later to be described and generally designated at 14 are provided in the tube 6 in front of said photocells.

In order to detect the infected area in the natural channels the endoscopic tube 6 and the rod 7 can be moved either together or separately. Of course in the last instance the transparent windows 14 should be of the appropriate size to allow the photo-cells 8 and 9 always to be exposed to the radiation emitted by the examined local areas.

When for instance, as shown in FIG. 1, the photo-cell 8 faces a tumor 1, the photo-cell 8 will be exposed to an increased irradiation whereas the photo-cell 9 remains exposed to the natural infra-red irradiation of an area of normal tissue. The external receiver system 11 to which the different signals produced by the photo-cells 8 and 9 are fed is advantageously a conventional differential amplifier the output of which is connected to a voltmeter 16: the index 17 of this voltmeter remains set into its zero position as long as the instantaneous quantities of infra-red radiations applied to both cells 8 and 9 are the same, these quantities then corresponding to the "parasite" radiations of the considered areas. However the index 17 is deviated when one of the photo-cells is exposed to an instantaneous quantity of radiations higher than for the other, namely when in the proximity of an abnormal thermogenous focus. Moreover the direction of the deviations of the index 17 of the voltmeter 16 will indicate which of the two cells is the one exposed to the radiations from the thermogenous focus and the angle of said deviation will provide information concerning the importance of such a focus and/or of its distance to one of the cells.

A radioscopic or radiographic examination or an endoscopic examination concomitant with such thermogenous examination will permit the exact location in the natural channel of the considered thermogenous focus.

The voltmeter 16 can also cooperate with a recording system for instance for recording the deviations of its index in relation with scanning under constant speed of a natural channel by one of the cells 8 and 9.

Since both the thermogenous focus and the local area of normal tissue to which the two photo-cells 8 and 9 are respectively exposed are subjected to substantially the same fluctuations of temperature owing to the air exchanges, it will be readily understood that the device according to the invention, which records the differences between the irradiations of the two photo-cells, overcomes said perturbations.

Preferably one at least of the two photo-cells is slidably mounted on the rod 7 for instance along a longitudinal grooved slot of the rod (not represented) and its position is controlled by means of strings, sticks, or the like, which can be provided within the rod 7 if the latter has a tubular section itself. Such construction will permit controlling of the distance between the two photo-cells 8 and 9 for instance in relation to the importance of the thermogenous focusses to be detected.

It should be noted that such a device will permit also the detection of "deep focusses," that is to say focusses not flush with the internal wall of the natural channel by eliminating the superficial emission of infra-red radiations. This can be achieved either by sending in said channel a draught of air, for instance previously cooled in ice or by providing in the immediate proximity of the photo-cells a cold body such as a little casing containing a refrigerated mixture or a refrigerating system using the reversed Peltier effect.

The application of the system described herebefore is however limited to the examination of the parts of the channels 3 and 4 which are alined or can be alined with the tube 6 or the rod 7 by subjecting, if the case should be, the patient to some trunk exercise.

Figure 2:
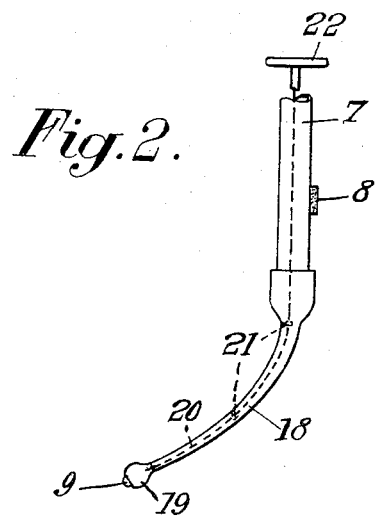
FIG. 2 shows an alternative embodiment of such a device.

However to permit at least one of the photo-cells to reach the remotest parts of the bronchia, the use of the alternative of the invention shown in FIG. 2, which will be described hereafter, is preferred. A flexible extension 18 is fitted at the extremity of the rod 7 and is adapted to extend beyond the lower extremity of the tube 6. One of the photo-cells, for instance the photo-cell 9, is located at the free extremity 19 of extension 18 which advantageously is hollow. This permits provision within this extension, on the one hand, of conductor means feeding the output from the photo-cell 9 to the above mentioned receiver system 11 and, on the other hand, of cable means 20 secured by one end to said extremity 19, guided within the extension by means of eyelets 21, which cable means 20 can be set under variable tension from outside by any appropriate conventional device 22 integral with the rod 7. By controlling the tension of the cable 20 it is thus possible to guide the extremity 19 within the secondary channels such as indicated at 24. The second photo-cell 8 cooperating with the photo-cell 9 and which serves to establish the differential detection as aforedescribed is provided either on the rod 7 as represented on FIG. 2 or within the extension 18.

Small photo-cells for detecting infra-red radiations, insertable in a tube whose interior diameter can reach 10 mm., are well known to those skilled in the art and preferably they should be sensitive to wave lengths ranging from 3 to 10 microns. Moreover they must be made of a material non-toxic and insoluble in water, or at least be protected by a coating of such a material, such a coating comprising a window transparent to the infra-red radiations to be detected.

The sensitive surfaces of these photo-cells are constituted for instance of lead sulphide or of indium sulphide, or they can also be made of lead selenide in the case where the photo-cell would be sufficiently cooled.

The windows 14 of the tube 6 can be constituted of corundum or sapphire (crystallized alumina), of quartz silica, silica glass, or certain flint glasses (comprising lead), such as the one known under the commercial designation "IR20," of titanium oxide so called "rutile," magnesium oxide so called "periclas," calcium aluminate or a glass made of arsenia trisulphide or germanium oxide known under the commercial designation "VIR3," or even of an appropriate sintered glass comprising magnesium fluoride or zinc sulphide. Sodium chloride could also be used but, owing to its solubility in water, it should be coated with a thin film of silicium monooxide SiO having a thickness of a few microns and obtained by evaporation under vacuum. The same should be applied to the other halogens crystallizing in the cubic system such as potassium iodate or potassium bromide or eutectic mixtures of the type KRS5 (thallium iodobromide) or KRS6 (thallium chlorobromide).

The invention is not limited to the embodiments above described and it includes all the alternatives thereof, in particular, those applied to the exploration of natural channels other than those of the lungs, for instance the digestive channels; those where the elements sensitive to the infra-red radiations are constituted not by photo-cells but by thermistors or by a small bolometer cooperating with a magnifying-glass made of germanium or a similar substance transparent to infra-red rays, said magnifying glass concentrating the infra-red radiations emitted by the examined area on the sensitive surface of said bolometer.

What we claim is:

1. A device for detecting thermogenous focusses in the internal channels of the lungs comprising endoscopic tube means open at both ends and provided with window means transparent to infra-red radiation, a hollow rod located within said endoscopic tube means, a first infra-red sensitive element provided on said rod and positioned adjacent said window means, a flexible extension secured to the lower end of said rod and extendable below the lower end of said endoscopic tube means, cable means secured to the extremity of said flexible extension and extending through said hollow rod, means to tension said cable to control the position of said extremity within the lungs, a second infra-red sensitive element positioned at the extremity of said flexible extension, said first and second sensitive elements producing electrical signal outputs varying in accordance with the intensity of infra-red radiations received by said sensitive elements, and an external differential receiver system electrically connected to said sensitive elements to receive said electrical signal outputs.

2. A device according to claim 1 wherein said infra-red sensitive elements are electric photo-cells.

(References on following page)

References Cited

UNITED STATES PATENTS

| | | | |
|---|---|---|---|
| 1,716,775 | 6/1929 | Hayes | 88—22.5 XR |
| 2,563,904 | 8/1951 | Adams et al. | 73—340 XR |
| 2,760,485 | 8/1956 | Adelman | 128—2 |
| 2,804,069 | 8/1957 | Schwamm et al. | 128—2 |
| 2,895,049 | 7/1959 | Astheimer et al. | 250—65 |
| 3,162,214 | 12/1964 | Bazinet | 128—4 XR |
| 3,306,282 | 2/1967 | Pierce | 128—2 |
| 3,335,716 | 8/1967 | Alt et al. | 128—2 |
| 3,339,542 | 9/1967 | Howell | 128—2 |

RICHARD A. GAUDET, Primary Examiner

KYLE L. HOWELL, Assistant Examiner

U.S. Cl. X.R.

73—340, 355, 360